US011709645B2

(12) United States Patent
Kaneko

(10) Patent No.: US 11,709,645 B2
(45) Date of Patent: Jul. 25, 2023

(54) WEARABLE TERMINAL DEVICE, CONTROL METHOD, AND SYSTEM

(71) Applicant: Canon Kabushiki Kaisha, Tokyo (JP)

(72) Inventor: Tsuyoshi Kaneko, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/689,213

(22) Filed: Mar. 8, 2022

(65) Prior Publication Data

US 2022/0291887 A1   Sep. 15, 2022

(30) Foreign Application Priority Data

Mar. 9, 2021 (JP) .................................. 2021-037187

(51) Int. Cl.

| | |
|---|---|
| G06F 3/14 | (2006.01) |
| G06V 20/20 | (2022.01) |
| G06F 3/01 | (2006.01) |
| G02B 27/01 | (2006.01) |
| G04G 21/04 | (2013.01) |
| G04G 9/00 | (2006.01) |
| H04W 4/80 | (2018.01) |

(52) U.S. Cl.
CPC ............ *G06F 3/14* (2013.01); *G02B 27/0172* (2013.01); *G06F 3/013* (2013.01); *G06V 20/20* (2022.01); *G02B 2027/014* (2013.01); *G02B 2027/0138* (2013.01); *G02B 2027/0178* (2013.01); *G04G 9/007* (2013.01); *G04G 21/04* (2013.01); *H04W 4/80* (2018.02)

(58) Field of Classification Search
CPC ...... G02B 2027/0138; G02B 2027/014; G02B 2027/0178; G02B 27/0172; G04B 47/00; G04G 21/00; G04G 21/02; G04G 21/04; G04G 9/0064; G04G 9/007; G06F 3/013; G06F 3/14; G06V 20/20; H04W 4/80; G09G 2354/00; Y02D 30/70
See application file for complete search history.

(56) References Cited

U.S. PATENT DOCUMENTS

| | | | | |
|---|---|---|---|---|
| 9,613,448 | B1* | 4/2017 | Margolin | G06T 11/001 |
| 10,025,350 | B2* | 7/2018 | Mizuno | G06F 1/163 |
| 10,229,543 | B2* | 3/2019 | Hato | G06T 19/006 |
| 11,218,617 | B2* | 1/2022 | Hosoda | H04N 1/4413 |
| 2011/0141856 | A1* | 6/2011 | Cho | G04G 13/02 368/79 |
| 2014/0232747 | A1* | 8/2014 | Sugimoto | G06T 11/00 345/633 |
| 2015/0138059 | A1* | 5/2015 | Large | G02F 1/1323 345/102 |

(Continued)

FOREIGN PATENT DOCUMENTS

JP   2015201160 A   11/2015

*Primary Examiner* — Dmitriy Bolotin
(74) *Attorney, Agent, or Firm* — Venable LLP

(57) ABSTRACT

A wearable terminal device capable of wirelessly communicating with a mobile terminal device having a display unit, the wearable terminal device comprising receiving status information of the mobile terminal device from the mobile terminal device when status of the mobile terminal device changes, determining whether or not to select display of the wearable terminal device based on the status information, and controlling the display of the wearable terminal device based on a determination result by the determining.

16 Claims, 7 Drawing Sheets

(56) References Cited

U.S. PATENT DOCUMENTS

| | | | |
|---|---|---|---|
| 2016/0012612 A1* | 1/2016 | Koga | G09G 5/397 |
| | | | 345/633 |
| 2016/0027216 A1* | 1/2016 | da Veiga | G06F 3/013 |
| | | | 345/158 |
| 2016/0132189 A1* | 5/2016 | Choi | G06F 3/012 |
| | | | 345/633 |
| 2017/0310849 A1* | 10/2017 | Hosoda | G06F 3/1203 |
| 2019/0164347 A1* | 5/2019 | Floury | G06F 3/1423 |
| 2019/0179406 A1* | 6/2019 | Manda | G06F 3/0416 |
| 2021/0084259 A1* | 3/2021 | Kies | A63F 13/655 |
| 2021/0097915 A1* | 4/2021 | Yamazaki | G09G 5/006 |
| 2021/0318541 A1* | 10/2021 | Huang | G02B 27/017 |
| 2022/0044481 A1* | 2/2022 | Tzeng | G06T 19/006 |

* cited by examiner

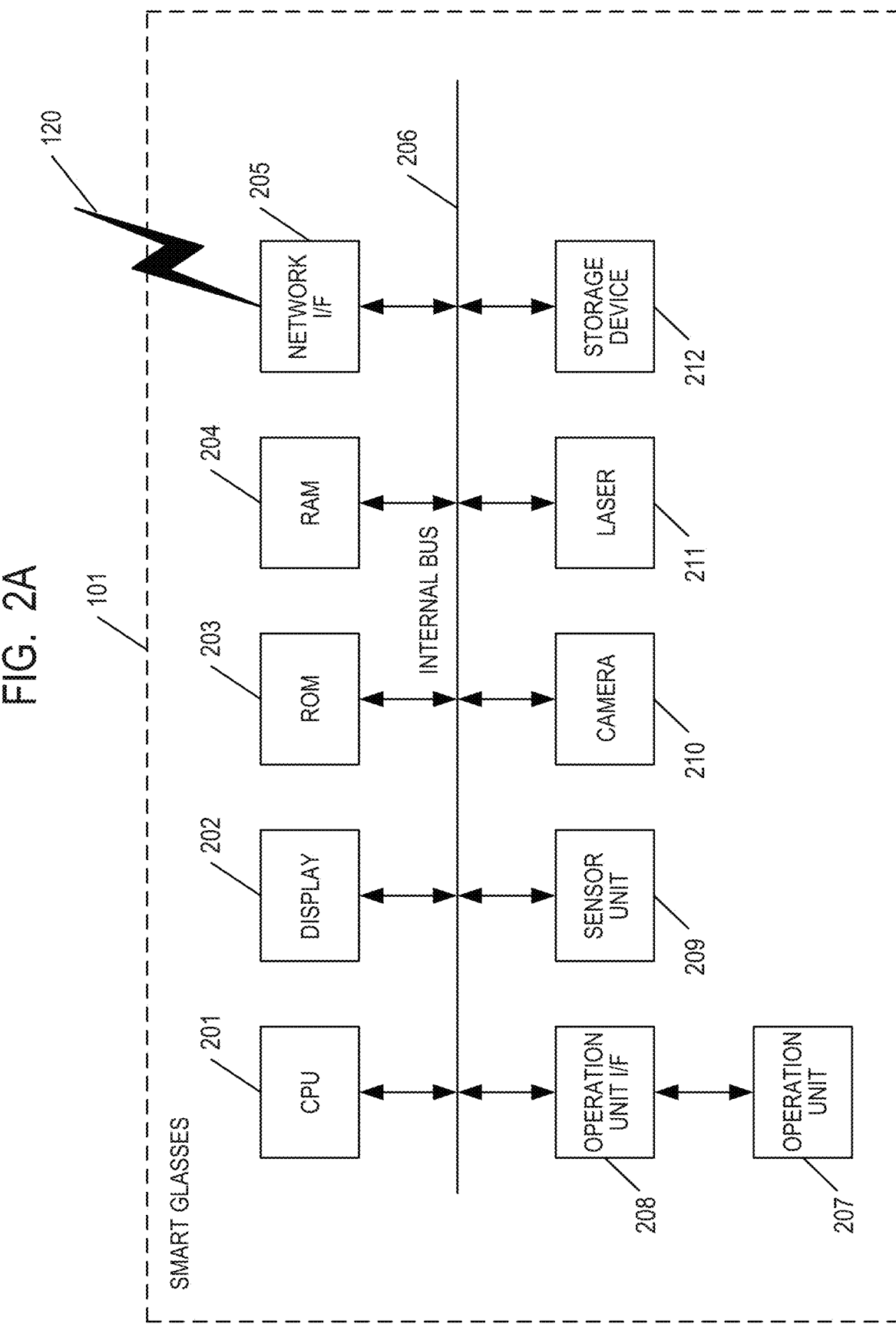

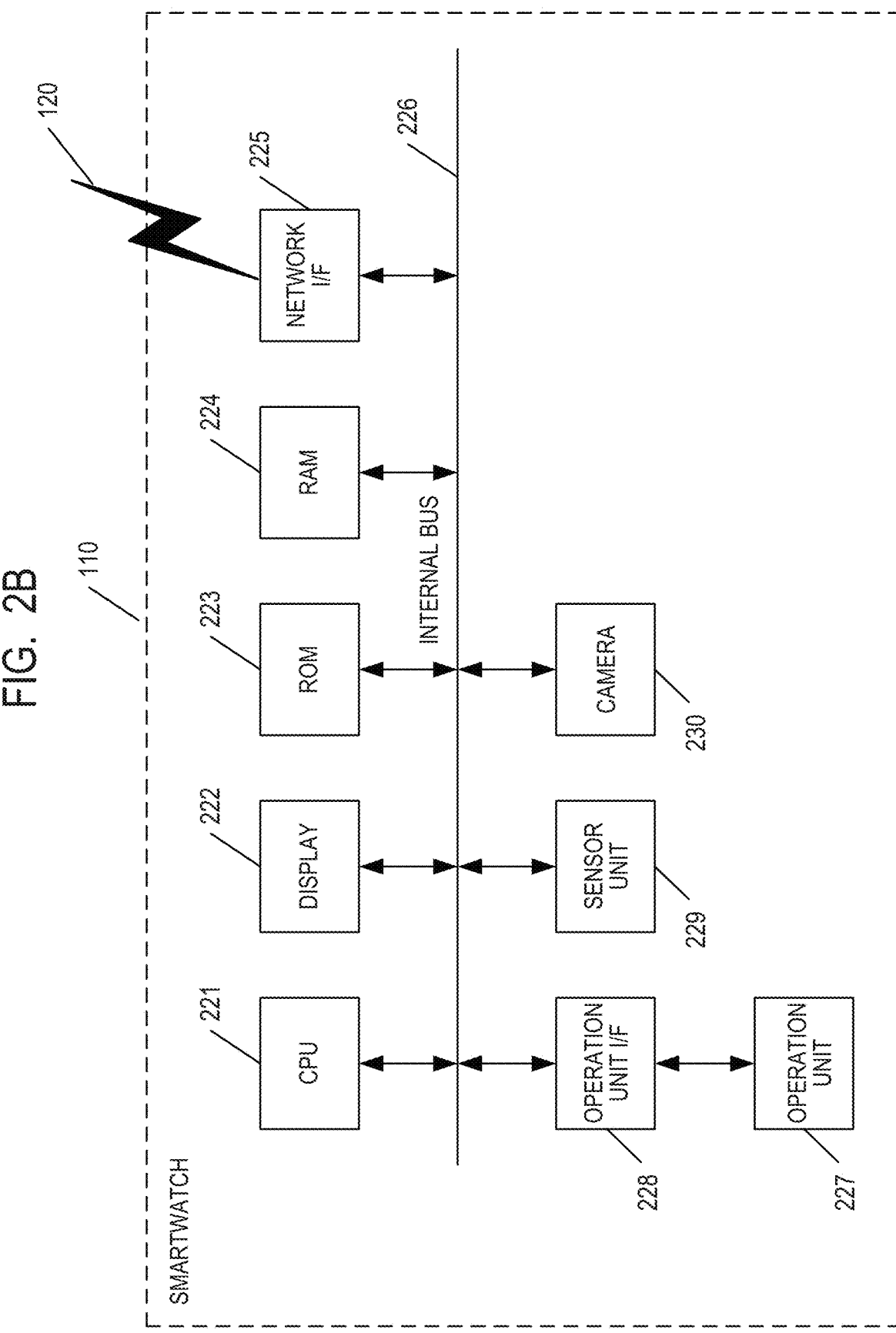

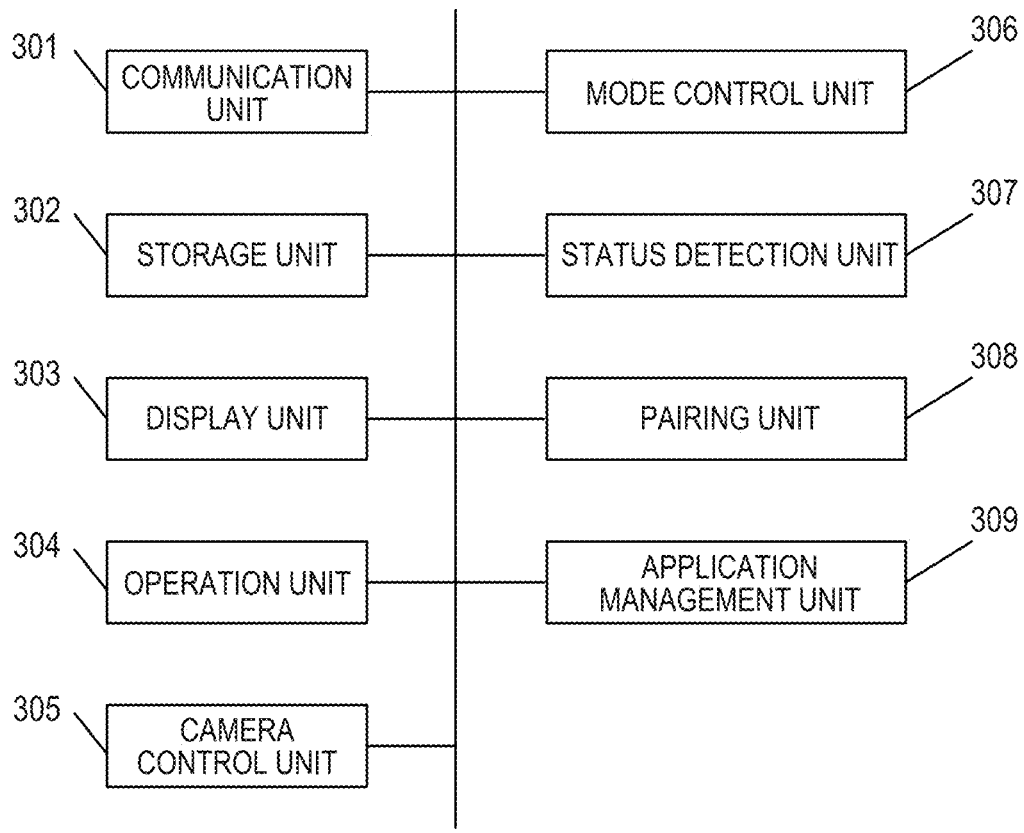
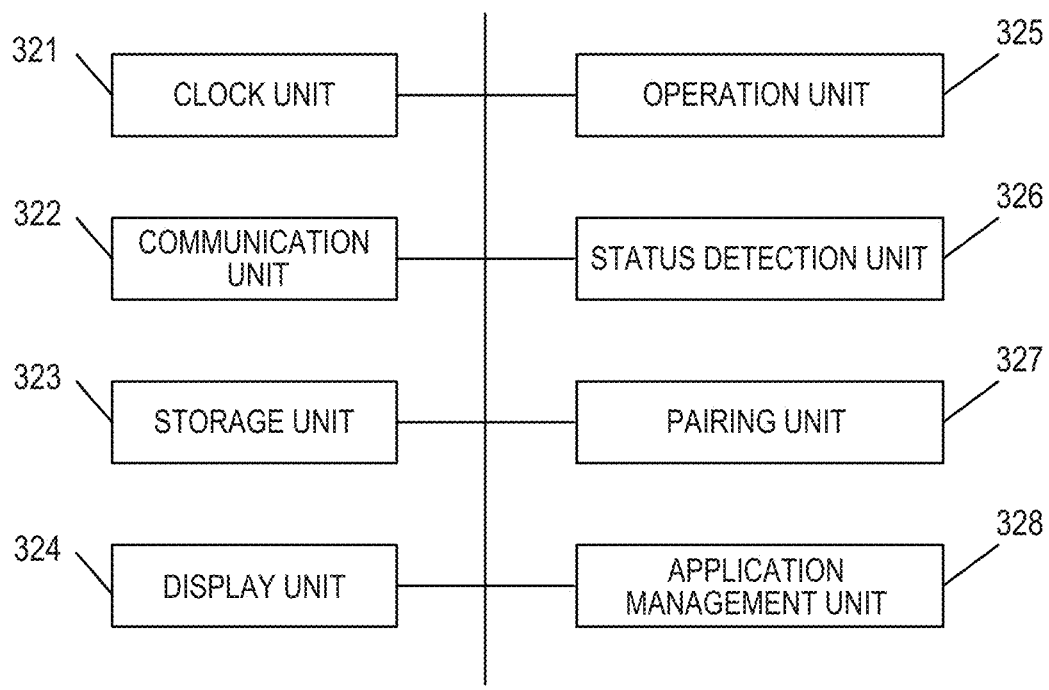

WEARABLE TERMINAL DEVICE, CONTROL METHOD, AND SYSTEM

BACKGROUND OF THE INVENTION

Field of the Invention

The present invention relates to a mechanism for controlling the display of an application by the cooperation of a wearable terminal device such as smart glasses, a portable terminal of a smartphone, or a smartwatch.

Description of the Related Art

In recent years, the diversification of mobile devices including wearable devices (smart glasses, smartwatches, smartphones, etc.) has advanced, and there are many cases where multiple devices are worn at the same time. Smart glasses and other wearables often have different applications installed, looking at different screens for different purposes. Therefore, a system in which smart glasses equipped with a camera detect a line of sight and link the smartwatch with wireless communication is also considered (Japanese Patent Application Laid-Open No. 2015-201160).

If each device has a screen, such as a smartphone and a smartwatch, one screen does not overlap the other. However, in the case of the smart glasses and the other mobile devices, the display of the smart glasses overlaps with the display of the other mobile devices, so that it is difficult for the user to see the other mobile devices via the smart glasses.

SUMMARY OF THE INVENTION

The present invention improves convenience when using another portable terminal and a wearable terminal by controlling the display of the wearable terminal according to a user's purpose.

According to an aspect of the present invention, a wearable terminal device connected with a network and worn by a user, the wearable terminal device comprises: at least one processor and at least a memory coupled to the at least one processor and having instructions stored thereon, and when executed by the at least one processor, acting as projecting a captured image in a field of view of the user, and controlling projection of the captured image to hide or reduce the projected image when a mobile terminal device is present in the field of view of the user, the mobile terminal device communicating with the wearable terminal device via the network.

Further features of the present invention will become apparent from the following description of exemplary embodiments with reference to the attached drawings.

BRIEF DESCRIPTION OF THE DRAWINGS

FIG. 2A illustrates a hardware configuration diagram of the smart glasses.

FIG. 2B illustrates a hardware configuration diagram of the smartwatches.

FIG. 3A illustrates a software configuration diagram of smart glasses.

FIG. 3B illustrates a software configuration diagram of the smartwatches.

DESCRIPTION OF THE EMBODIMENTS

First Example Embodiment

<Overview of Smart Glasses and Smartwatches>

Hereinafter, an embodiment of the present invention will be described with reference to the drawings.

Figure 1:
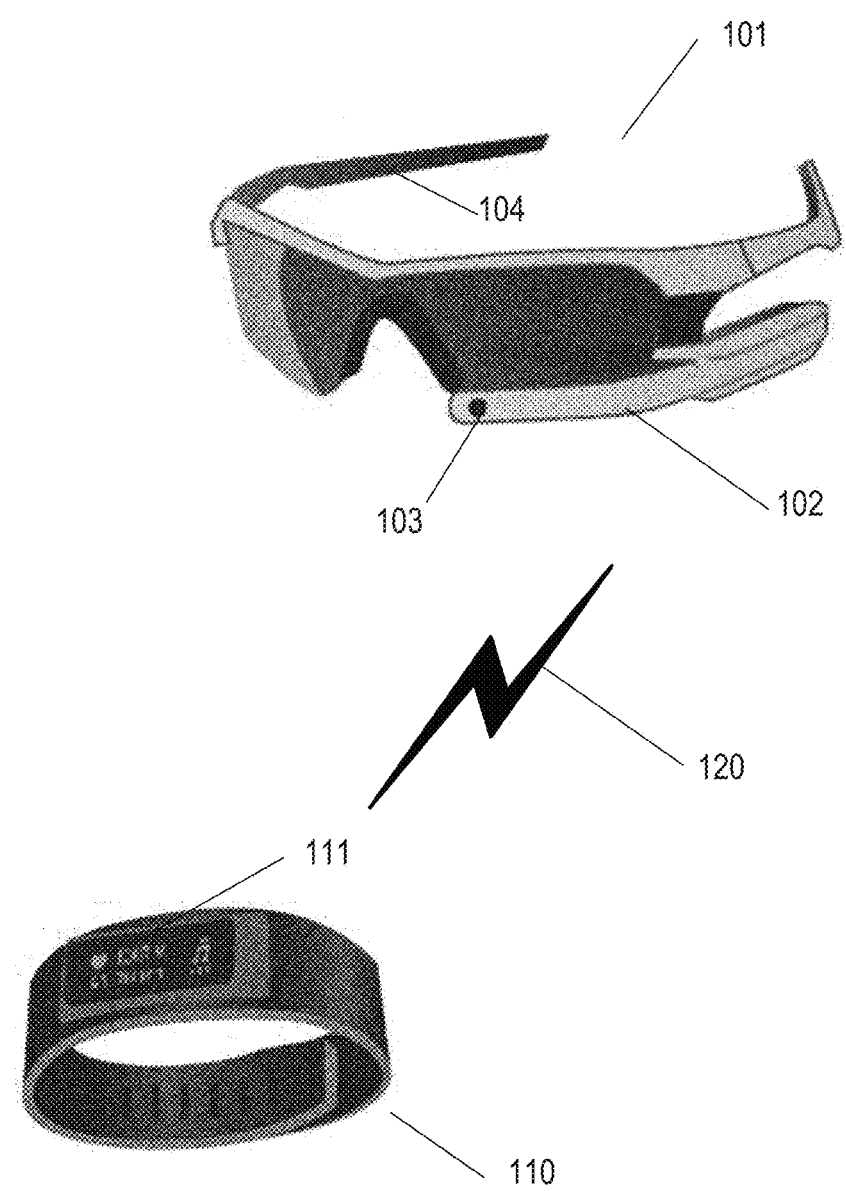
FIG. 1 illustrates an overview of smart glasses and smartwatches.

FIG. 1 is a diagram illustrating an overview and connection relationship between smart glasses and smartwatches.

The smart glasses 101 is a mounting type information terminal device to be mounted by a user and displays a virtual image in the field of view on a display unit 102 without obstructing the field of view of the user. Such a display is called AR (Augmented Reality) or MR (Mixed Reality) and is provided by functions of projecting information on a transmissive display (lens) or retina. The display unit 102 is provided with a camera unit 103 for capturing objects in the viewing direction of the user.

The operation frame unit 104 is provided with a touch sensor and is a frame for operating a terminal device.

The smartwatch 110 is a wrist watch-type information terminal device worn by a user on the wrist, and the display unit 111 not only displays information such as time but also functions as a touch panel and can operate the terminal device. The wireless communication 120 for exchanging data between the smart glasses 101 and the smartwatch 110 is assumed to be wireless communication of a standard such as Bluetooth or NFC (Near Field Communication) but is not limited to this. In the following description, a portable terminal device linked with the smart glasses 101 is described as a smartwatch 110. However, it is not limited to this, and a device having a display for communicating with the smart glasses 101 may be used. For example, it can be a mobile device such as a tablet or a smartphone.

<Hardware Configuration>

(Smart Glasses)

FIG. 2A illustrates a configuration of smart glasses 101 according to an embodiment of the present invention. The CPU 201 comprehensively controls various functions of the smart glasses 101 via the internal bus 206 by an application program stored in the ROM 203. The execution result of the application program executed by the CPU 201 is displayed on the display 202. In the present embodiment, the display system is assumed to be a system in which the user views the image projected onto the transmissive display, but a system in which the image is projected directly onto the retina or the like may be adopted. The ROM 203 is a flash memory or the like, and stores various kinds of setting information and application programs as described above. The RAM 204 functions as a memory and a work area of the CPU 201. The network I/F 205 controls the smart glasses 101 to exchange data with an external network device in one or both directions via the wireless communication 120. The operation unit 207 receives an input from the user by the operation frame unit 104 and transmits a signal corresponding to the input to the aforementioned processing units by the operation unit I/F 208. The sensor unit 209 includes a GPS (Global Positioning System), a gyro sensor, an acceleration sensor, a proximity sensor, a blood pressure/heart rate measurement sensor, a line of sight detection sensor, and the like. The sensor unit 209 can detect biometric information such as fingerprint authentication, vein authentication, and iris authentication. A camera 210 of the camera unit 103 has a capturing function and the captured image data are stored in the ROM 203. The laser 211 projects various contents onto the display 202, and in the case of a retinal projection system, projects the contents directly onto the retina. The storage device 212 is a storage medium and stores various data such as applications.

The smart glasses 101 also includes a device for reading data from the storage medium and a device for deleting the data. Some terminals do not have the storage device 212 but only the ROM 203.

(Smartwatches)

FIG. 2B illustrates a structure of the smartwatch 110 according to an embodiment of the present invention. The CPU 221 comprehensively controls various functions of the smartwatch 110 via the internal bus 226 by an application program stored in the ROM 223. The result of the application program executed by the CPU 221 is displayed on the display 222 of the display unit 111. The ROM 223 is a flash memory or the like, and stores various kinds of setting information and application programs as described above. The RAM 224 functions as a memory and a work area of the CPU 221. The network I/F 225 controls the smartwatch 110 to exchange data with an external network device in one or both directions via the wireless communication 120. The operation unit 227 receives an input from the user on the display unit 111 and transmits a signal corresponding to the input to the processing units described above by the operation unit I/F 228. The sensor unit 229 includes a GPS, a gyro sensor, an acceleration sensor, a proximity sensor, a blood pressure/heart rate measurement sensor, a line of sight detection sensor, and the like. The camera 230 has a capturing function, and the captured image data are stored in the ROM 223. The user's line of sight can be detected by the sensor unit 229 with the image data acquired through the camera 230.

<Software Configuration>

(Smart Glasses)

FIG. 3A is a diagram for explaining the software module configuration of the smart glasses 101. A communication unit 301 receives status information of the smartwatch 110 and notification from an application server. The storage unit 302 exchanges information between the ROM 203 and the RAM 204 and other processing units. The storage unit 302 stores image data captured by the camera 210 and the like.

The display unit 303 displays the results of various applications executed by the CPU 201, such as AR/MR display. For example, using AR technology, content is displayed (information projected) on the display 202 such that virtual content is superimposed on the real space. It should be noted that the present invention may employ a method of directly projecting the contents onto the retina. Here, in the information projection, the position and the posture of the user in the real space may be estimated based on a technique such as SLAM (simultaneous localization and mapping). The estimation result is used for virtual content display processing.

An operation unit 304 receives an input from a user in the operation frame unit 104 to receive and control the operation of various applications and instructions of operation for display on the display 202. A camera control unit 305 controls starting, stopping and capturing of the camera 210, and stores captured image data in the ROM 203 in cooperation with the storage unit 302. A mode control unit 306 controls switching to a plurality of modes provided in the smart glasses 101, and switches the smart glasses 101 to a mode desired by the user. A status detection unit 307 manages information such as a change in status and a utilization state detected by the sensor unit 209 and stores them in the ROM 203. The pairing unit 308 controls the network I/F 205 to enable bidirectional data communication with an external network device via the wireless communication 120. An application management unit 309 manages the execution state of various applications, version information, notifications received from a server, and the like, and stores them in the ROM 203 and the RAM 204 via the storage unit 302.

(Smartwatches)

FIG. 3B is a diagram for explaining the software module configuration of the smartwatch 110. A clock unit 321 manages and controls time information to be displayed on the display 222.

The time information may be managed and controlled by an application program stored in the ROM 223. A communication unit 322 not only transmits status information to the smart glasses 101 but also receives a notification from an application server. The status information indicates the state of the application, such as when the application is running or displayed, the state of the display, and the state of the main unit, such as when the main unit is sleeping. The storage unit 323 exchanges information between the ROM 223 and the RAM 224 and other processing units. The display unit 324 displays time information managed by the clock unit 321 and the results of various applications executed by the CPU 221. An operation unit 325 receives input from a user in a display unit 111, and controls the operation of various applications and display on the display 222. A status detection unit 326 manages the change of the status detected by the sensor unit 229 as information and stores it in the ROM 223. The pairing unit 327 controls the network I/F 225 to enable bidirectional data communication with an external network device via the wireless communication 120. An application management unit 328 manages the execution state of various applications, version information, notifications received from a server, and the like, and stores them in the ROM 223 and the RAM 224 via the storage unit 323.

<Flow of Processing>

(Smartwatch (The Notification Processing of the Status Information))

Figure 4A:
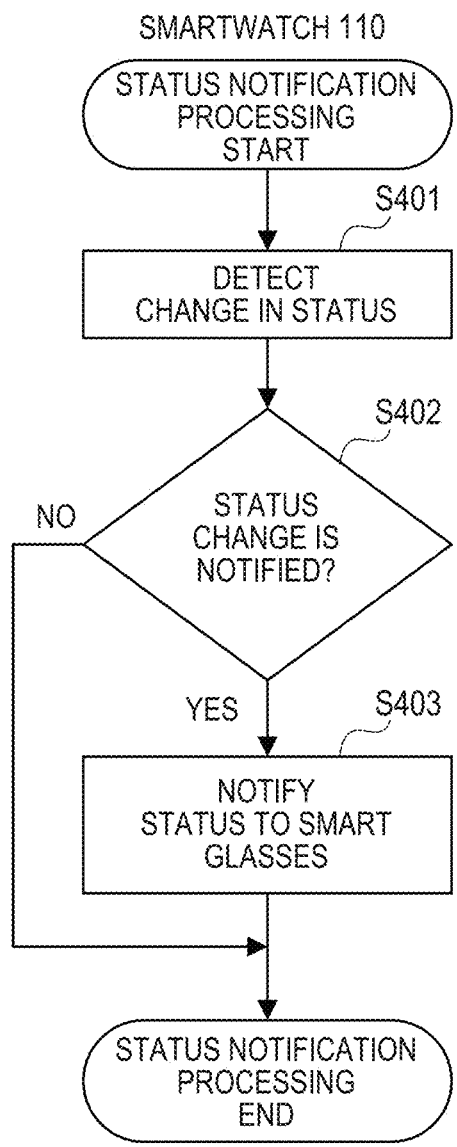
FIG. 4A is a flowchart illustrating the status notification processing of the smartwatches.

FIG. 4A illustrates a flowchart of a status information notification process in which the smartwatch 110 detects a status change and notifies the status information to the smart glasses 101. The smartwatch 110 has a setting for determining the status to be transmitted to the smart glasses 101 among the detected status changes in the storage unit 323 (see Table 1). The smartwatch 110 selects whether or not to notify the status information to the smart glasses 101 for each status according to the setting of the status notification setting table in Table 1. In this embodiment, the smartwatch 110 selects the status information to be notified, but the smart glasses 101 may select the status information to be notified. Specifically, the status notification setting table of Table 1 may be stored in the storage unit 302 of the smart glasses 101 in order for the smartwatch 110 to notify all the status information and discard the status information of the smartwatch 110 received by the smart glasses 101. The status notification setting may be performed by the smart glasses 101 or the smartwatch 110.

TABLE 1

The status notification setting table

| Status | Notification |
| --- | --- |
| Application launch | ON |
| Displaying application | ON |
| Power charging | OFF |
| Sleeping | ON |
| Start of the main unit | OFF |

First, in step S401, the smartwatch 110 detects a change in status by the status detection unit 326. The change of the status indicates that the status has changed to each of the statuses described above, for example, a case where the display is switched from a state in which the time is displayed on the display unit 324 to another application.

In step S402, the smartwatch 110 refers to the status notification setting table to determine whether or not the status change is to be notified to the smart glasses 101. If it is determined in step S402 that the detected status change should be notified to the smart glasses 101 (Yes in step S402), the process proceeds to step S403. If it is determined that the detected status change should not be notified to the smart glasses 101 (No in step S402), the process ends.

In step S403, the status information is transmitted to the smart glasses 101. The transmission destination of the status information at this time is a device paired with the smartwatch 110.

Further, when the smartwatch 110 transmits the status information to the smart glasses 101 in step S403, the smartwatch 110 may switch whether or not to transmit the status information according to the radio wave strength of Bluetooth (beacon) or the like transmitted from the smart glasses 101. For example, if the radio wave intensity of Bluetooth transmitted from the smart glasses 101 is equal to or greater than a predetermined value, the smartwatch 110 transmits status information. That is, the status information is transmitted only when the smartwatch 110 and the smart glasses 101 are sufficiently close to each other.

(Smart Glasses (The Hide Processing))

Figure 4B:
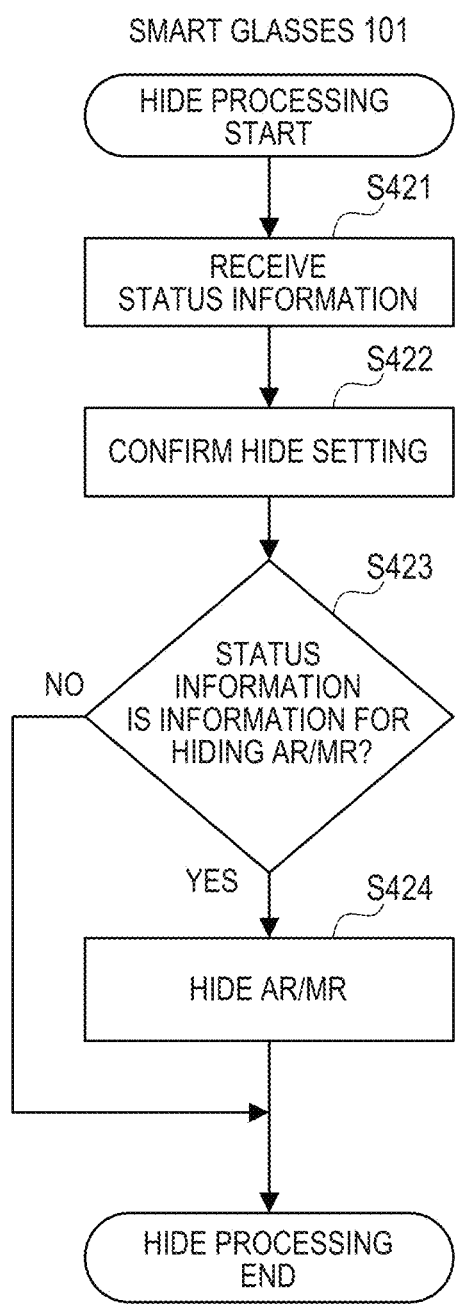
FIG. 4B is a flowchart illustrating the hide processing of the smart glasses.

FIG. 4B is a flowchart illustrating a display process in which the smart glasses 101 hide the AR/MR in response to a status change of the smartwatch 110. The smart glasses 101 have a setting for determining whether to hide the AR/MR according to the status notified from the smartwatch 110 in the storage unit 302 (see Table 2). In accordance with the setting of the display setting table in Table 2, the smart glasses 101 control whether or not the AR/MR is hidden for each notified status. The display setting of AR/MR is possible by the smart glasses 101.

TABLE 2

Display configuration table

| Received status | Display |
| --- | --- |
| Application launch | Hide |
| Display application | Hide |
| Sleeping | View |

First, in step S421, the smart glasses 101 receive status information from the smartwatch 110 via the communication unit 301.

In step S422, the smart glasses 101 refer to the display setting table in Table 2.

In step S423, the smart glasses 101 determine whether or not the status information of the smartwatch 110 received in step S421 is an object for which the AR/MR 501 is to be hidden. If it is determined in step S423 that the status information is not the status information for which the AR/MR 501 is to be hidden (No in step 423), the process ends. If it is determined in step S423 that the status information is the status information for which the AR/MR 501 is to he hidden (Yes in step S423), the process proceeds to step S424.

Figure 5A:
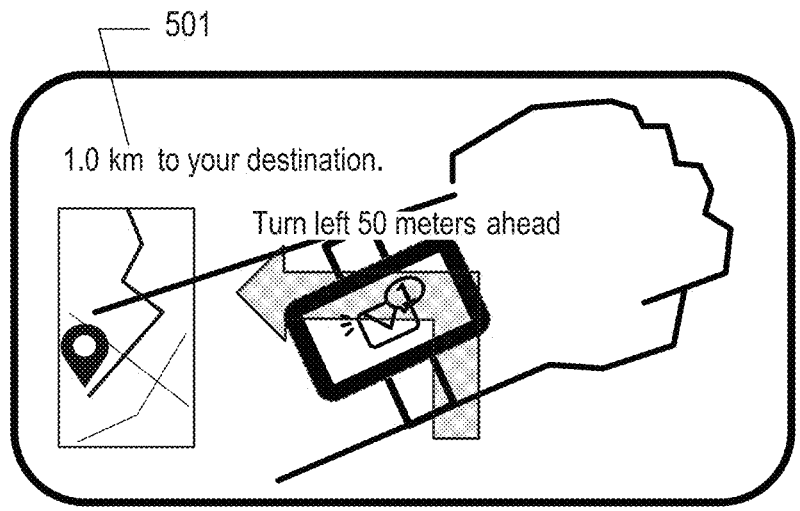
FIG. 5A illustrates an example of a display when AR/MR displayed by the smart glasses is displayed.
Figure 5B:
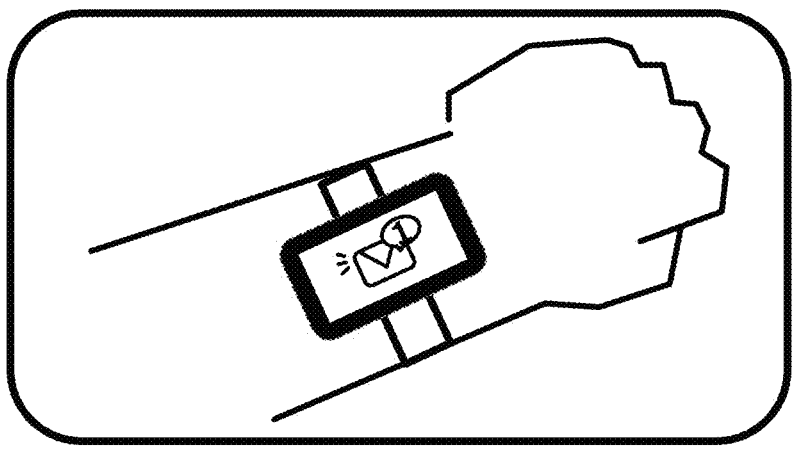
FIG. 5B illustrates an example of a display when AR/MR displayed by the smart glasses is not displayed.

In step S424, the smart glasses 101 perform display control so as to hide the AR/MR 501 displayed on the display 202, and ends the process. That is, the state of the display 202 of the smart glasses 101 becomes from a state in which the AR/MR 501 is displayed as illustrated in FIG. 5A to a state in which the AR/MR 501 is not displayed as illustrated in FIG. 5B.

Here, the smartwatch 110 notifies the smart glasses 101 of the status information, and the smart glasses 101 hide the AR/MR 501 based on the status information. However, the smartwatch 110 may notify the smart glasses 101 only when the status is predetermined, and the smart glasses 101 receiving the notification may uniformly hide the AR/MR.

Thus, even when the AR/MR 501 is displayed on the smart glasses 101, the AR/MR 501 can be hidden when the mobile terminal device communicating with the smart glasses 101 accept the user operation and the status of the mobile terminal device changes. This makes it easy for the user to see the display of the mobile terminal device operated by the user. In addition, when the smart glasses 101 and the smartwatch 110 are sufficiently close to each other, the AR/MR 501 of the smart glasses 101 can be hidden when the user operation is accepted by the smartwatch 110.

The present embodiment has shown a processing flow for controlling the AR/MR display of the smart glasses 101 in accordance with the status of the smartwatch 110. However, it is also possible to hide the AR/MR by detecting the touch operation of the operation frame unit 104 or the remote operation to the smartwatch 110. Also, the configuration of each wearable terminal device, the configuration of the software module, and the processing flow relating to application notification of the wearable terminal device have been shown, but these are examples, and not limited thereto.

Second Example Embodiment

In the AR/MR display control described in the first example embodiment, there is a possibility that the user touches the smartwatch 110 unintentionally to hide the display of the smart glasses 101. In the second example embodiment, a mechanism will be described which, in addition to the status of the smartwatch 110, hides the AR/MR by detecting the presence of the smartwatch 110 in the user's line of sight or in the user's field of view. Since the basic configuration of the second example embodiment is the same as that of the first embodiment, only differences between the first and the second example embodiments are shown.

(Smartwatch (The Notification Processing of the Status Information))

Figure 6A:
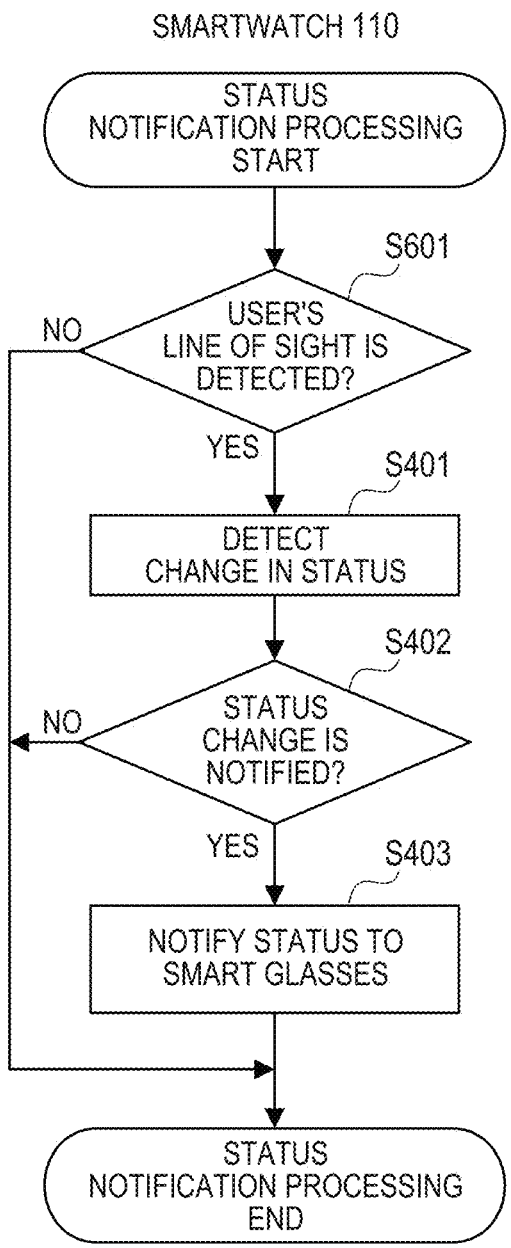
FIG. 6A is a flowchart illustrating the status notification processing of the smartwatches.

FIG. 6A is a flowchart illustrating a status notification process in which the smartwatch 110 detects a user's line of sight and a status change of the smartwatch 110, and notifies the status information to the smart glasses 101. As in the first example embodiment, the smartwatch 110 has a setting for determining the status to be transmitted to the smart glasses 101 among the detected status changes in the storage unit 323 (see Table 1). The smartwatch 110 controls whether or not to notify the smart glasses 101 for each status according to the setting of the status notification setting table in Table 1. Although the status notification setting table is held by the smartwatch 110 in the present embodiment, the status information of the smartwatch 110 received by the smart glasses 101 may be stored in the storage unit 302 of the smart glasses 101 in order to discard the status information. The notification setting may be performed by the smart glasses 101 or the smartwatch 110.

In step S601, the smartwatch 110 detects the user's line of sight with a camera provided in the smartwatch 110. If the user's line of sight is detected (Yes in step S601), the process proceeds to step S401. If the user's line of sight is not detected (No in step S601), the process ends. Since the steps S401 to S403 are the same as those in the first example embodiment, the description thereof is omitted.

In the above description, the user's line of sight is detected by the camera provided in the smartwatch 110, but the line of sight can also be detected by the camera provided in the smart glasses 101. Specifically, the camera provided in the smart glasses 101 catches the smartwatch 110 to detect the user's line of sight when the user looks at the smartwatch 110. The smartwatch 110 may detect the user's line of sight by notifying, from the smart glasses 101, the smartwatch 110 that the user is looking at the smartwatch 110. If the smart glasses 101 detects the user's line of sight, the detection of the user's line of sight in step S601 is not an essential step.

(Smart Glasses (The Hide Processing))

Figure 6B:
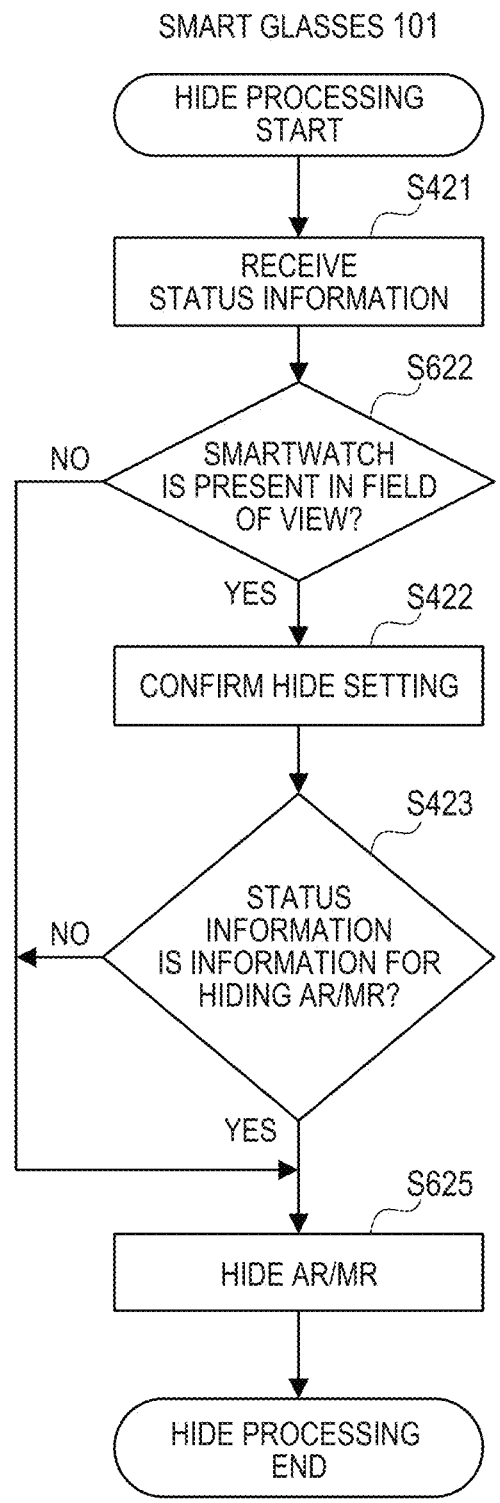
FIG. 6B is a flowchart illustrating the hide processing of the smart glasses.

FIG. 6B is a flowchart illustrating a hide process in which the smart glasses 101 detect a status change of the smartwatch 110 and the presence of the smartwalch in the field of view to hide the AR/MR 501. As in the first example embodiment, the smart glasses 101 have a setting for determining whether to hide the AR/MR 501 according to the status information notified from the smartwatch 110 in the storage unit 302 (see Table 2). In accordance with the selling of the display setting table in Table 2, the smart glasses 101 control whether or not the AR/MR 501 is hidden for each notified status. The display setting of AR/MR is possible by the smart glasses 101.

In step S421, the smart glasses 101 receive the status information from the smartwatch 110 via the communication unit 301.

In step S622, the smart glasses 101 determine whether or not the smartwatch 110 is present in the user's field of view. The camera control unit 305 determines whether or not the smartwatch 110 is present. The camera control unit 305 determines whether or not the smartwatch 110 is detected with the image captured by the camera 210. For example, the camera provided in the smart glasses detects the smartwatch 110, or detects the user's line of sight to determine whether the smartwatch 110 is present at the user's line of sight. The details of this process are not the points of the present invention and will not be described. As a result of the determination in step S622, if the smartwatch 110 is present in the user's field of view (Yes in step S622), the process proceeds to step S422. If the smartwatch 110 is not present in the user's field of view (No in step S622), the process ends. The steps S422 to S423 are the same as those in the first example embodiment, and their description is omitted.

If it is determined in step S423 that the status information is the status information for which the AR/MR is hidden (Yes in step S423), the process proceeds to step S625.

Figure 5C:
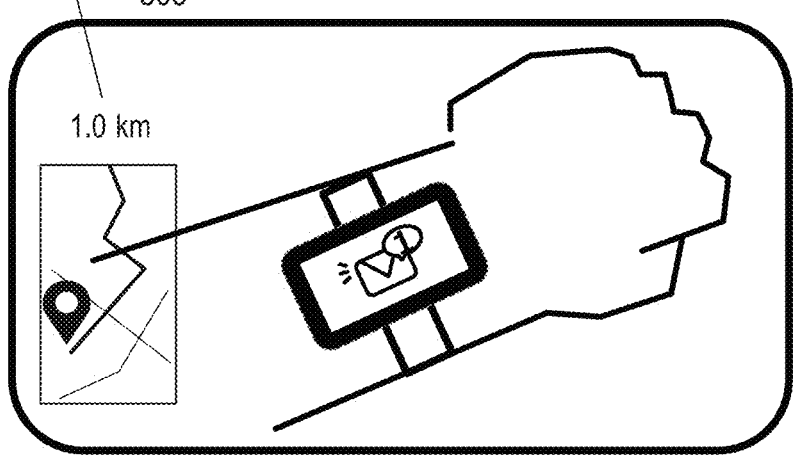
FIG. 5C illustrates an example of a display when AR/MR displayed by the smart glasses is reduced displayed.

In step S625, the smart glasses 101 perform display control to hide the AR/MR displayed on the display 202 (FIG. 5B). In this case, the AR/MR display may be controlled so that the AR/MR display is switched from the normal display to the reduced display as illustrated in FIG. 5C, instead of the AR/MR display being hidden. Then, the process ends.

It is also possible to determine whether or not the mobile terminal device to which the smart glasses 101 are paired is in the visual field by the determination in step S622. Thus, the smart glasses 101 can control the display of the AR/MR so as not to hide the AR/MR even if the other person's mobile terminal device is present in the visual field.

As a result of the above processing, when the user is looking at the other mobile terminal device via the smart glasses 101, the AR/MR of the smart glasses 101 is not displayed, so that the view of the user is not obstructed.

In addition, the smart glasses 101 may hide the AR/MR when the smartwatch 110 is nearby in accordance with the radio wave intensity of the Bluetooth packet transmitted from the smartwatch 110. Further, the smart glasses 101 may determine that the distance between the smartwatch 110 and the smart glasses 101 is sufficiently close because the display of the smartwatch 110 detected by the camera of the smartwatch 110 becomes larger than a predetermined size, and may control the display so as to hide the AR/MR.

In addition to the status of the smartwatch 110, the present embodiment has shown a processing flow for controlling the AR/MR display of the smart glasses 101 by detecting the presence of the smartwatch 110 in the user's line of sight or the user's field of view.

In the above embodiment, the smart glasses 101 hide the AR/MR according to the status of the smartwatch 110, but it is also possible to hide the AR/MR in consideration of the status of the smart glasses 101. For example, if the smart glasses 101 display important information, the AR/MR may not be hidden regardless of the status of the smartwatch 110.

In the above embodiment, the processing flow for each mobile terminal device, the configuration of the wearable terminal device, the configuration of the software module, and the application notification of the mobile terminal device has been shown, but these are examples, and not limited to these examples.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer ay comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-037187, filed Mar. 9, 2021, which is hereby incorporated by reference herein in its entirety.

What is claimed is:

1. A wearable terminal device connected with a network and worn by a user, the wearable terminal device comprising:
at least one processor and at least a memory coupled to the at least one processor and having instructions stored thereon, and when executed by the at least one processor, executing:
displaying a content image in a field of view of the user; and
controlling display of the content image to hide or reduce the displayed image when a terminal device is present in the field of view of the user,
wherein
the controlling controls the display of the content image to hide or reduce the displayed image when the terminal device is a predetermined terminal device paired with the wearable terminal device and communicating with the wearable terminal device via the network and the terminal device is present in the field of view of the user,
the controlling controls the display of the content image not to hide or reduce the displayed image when the terminal device is not the predetermined terminal device paired with the wearable terminal device and the terminal device is present in the field of view of the user, and
the controlling controls the display of the content image to hide or reduce the displayed image based on status information of the terminal device acquired from the terminal device via the network, and
wherein the controlling,
in a case where the status information is first information, controls display of the content image to hide or reduce the displayed image when the predetermined terminal device is present in the field of view of the user, and
in a case where the status information is second information indicating that the terminal device is sleeping, controls display of the content image not to hide or reduce the displayed image even when the predetermined terminal device is present in the field of view of the user.

2. The wearable terminal device according to claim 1, wherein the predetermined terminal device is a terminal device whose distance from the wearable terminal device is close.

3. The wearable terminal device according to claim 1, wherein the wearable terminal device further comprises a camera, and
wherein the controlling controls the display of the content image to hide or reduce the displayed image when the terminal device is present in an image captured by the camera.

4. The wearable terminal device according to claim 1, wherein the wearable terminal device further comprises a detection sensor detecting line of sight of the user,
wherein the controlling controls the display of the content image to hide or reduce the displayed image when the detection sensor detects that the terminal device is present in the line of sight of the user.

5. The wearable terminal device according to claim 1, wherein the controlling controls the display of the content image to hide or reduce the displayed image when the terminal device is present over the displayed image.

6. The wearable terminal device according to claim 1, wherein the controlling controls the display of the content image to hide or reduce an AR (Augmented Reality) display or a MR (Mixed Reality) display.

7. A method for a wearable terminal device connected with a network and worn by a user, the method comprising:
displaying a content image in a field of view of the user; and
controlling display of the content image to hide or reduce the displayed image when a terminal device is present in the field of view of the user,
wherein the display of the content image is controlled to hide or reduce the displayed image when the terminal device is a predetermined terminal device paired with the wearable terminal device and communicating with the wearable terminal device via the network and the terminal device is present in the field of view of the user,
the display of the content image is controlled not to hide or reduce the displayed image when the terminal device is not the predetermined terminal device paired with the wearable terminal device and the terminal device is present in the field of view of the user, and
the display of the content image is controlled to hide or reduce the displayed image based on status information of the terminal device acquired from the terminal device via the network, and
wherein the display of the content image is controlled,
in a case where the status information is first information, to hide or reduce the displayed image when the predetermined terminal device is present in the field of view of the user, and
in a case where the status information is second information indicating that the terminal device is sleeping, not to hide or reduce the displayed image even when the predetermined terminal device is present in the field of view of the user.

8. A wearable terminal device capable of wirelessly communicating with a terminal device having a display unit, the wearable terminal device comprising:
at least one processor and at least a memory coupled to the at least one processor and having instructions stored thereon, and when executed by the at least one processor, executing:
receiving status information of the terminal device from the terminal device; and
controlling display of a content image displayed in a field of view of a user based on the status information,
wherein the controlling,
in a case where the status information is first information, controls display of the content image to hide or reduce the displayed image when the terminal device is present in the field of view of the user, and in a case where the status information is second information indicating that the terminal device is sleeping, controls display of the content image not to hide or reduce the displayed image even when the terminal device is present in the field of view of the user.

9. A system including a wearable terminal device and a terminal device having a display unit, the system comprising:

the wearable terminal device comprising:

at least one processor and at least a memory coupled to the at least one processor and having instructions stored thereon, and when executed by the at least one processor, executing:

receiving status information of the terminal device from the terminal device; and controlling display of a content image displayed in a field of view of a user based on the status information, wherein the controlling, in a case where the status information is first information, controls display of the content image to hide or reduce the displayed image when the terminal device is present in the field of view of the user, and in a case where the status information is second information indicating that the terminal device is sleeping, controls display of the content image not to hide or reduce the displayed image even when the terminal device is present in the field of view of the user, and the terminal device comprising:

at least one processor and at least a memory coupled to the at least one processor and having instructions stored thereon, and when executed by the at least one processor, executing:

transmitting the status information to the wearable terminal device.

10. The system according to claim 9, wherein the transmitting transmits the status information to the wearable terminal device when status of the terminal device changes.

11. The system according to claim 9, wherein the transmitting transmits the status information to the wearable terminal device when a line of sight of the user is detected.

12. The system according to claim 9, wherein the transmitting selects whether or not to transmit the status information to the wearable terminal device based on intensity of Bluetooth signal received from the wearable terminal device.

13. The system according to claim 9, wherein the controlling is reducing the display of the image displayed in the field of view of the user.

14. The system according to claim 9, wherein the controlling is hiding or reducing AR (Augmented Reality) display or MR (Mixed Reality) display.

15. The system according to claim 9, wherein the first information indicates Application launch and/or Display application.

16. A system including a wearable terminal device and a predetermined terminal device having a display unit, the system comprising:

the wearable terminal device comprising:

at least one processor and at least a memory coupled to the at least one processor and having instructions stored thereon, and when executed by the at least one processor, executing:

displaying a content image in a field of view of the user; and controlling display of the content image to hide or reduce the displayed image when a terminal device is present in the field of view of the user, wherein the controlling controls the display of the content image to hide or reduce the displayed image when the terminal device is the predetermined terminal device paired with the wearable terminal device and communicating with the wearable terminal device via a network and the terminal device is present in the field of view of the user, the controlling controls the display of the content image not to hide or reduce the displayed image when the terminal device is not the predetermined terminal device paired with the wearable terminal device and the terminal device is present in the field of view of the user, and the controlling controls the display of the content image to hide or reduce the displayed image based on status information of the terminal device acquired from the terminal device via the network, and wherein the controlling, in a case where the status information is first information, controls display of the content image to hide or reduce the displayed image when the predetermined terminal device is present in the field of view of the user, and in a case where the status information is second information indicating that the terminal device is sleeping, controls display of the content image not to hide or reduce the displayed image even when the predetermined terminal device is present in the field of view of the user.

* * * * *